United States Patent
Gonze et al.

(10) Patent No.: US 8,365,517 B2
(45) Date of Patent: Feb. 5, 2013

(54) APPARATUS AND METHOD FOR REGENERATING AN EXHAUST FILTER

(75) Inventors: Eugene V. Gonze, Pinckney, MI (US); Michael J. Paratore, Jr., Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 553 days.

(21) Appl. No.: 12/482,625

(22) Filed: Jun. 11, 2009

(65) Prior Publication Data

US 2010/0313547 A1 Dec. 16, 2010

(51) Int. Cl.
*F01N 3/00* (2006.01)
(52) U.S. Cl. ............... 60/286; 60/274; 60/297; 60/299; 60/303
(58) Field of Classification Search .................. 60/274, 60/284–287, 295–301
See application file for complete search history.

(56) References Cited

U.S. PATENT DOCUMENTS

| | | | |
|---|---|---|---|
| 4,427,418 A | 1/1984 | Kogiso et al. | |
| 4,544,388 A | 10/1985 | Rao et al. | |
| 4,686,827 A * | 8/1987 | Wade et al. | 60/286 |
| 4,744,216 A | 5/1988 | Rao et al. | |
| 5,711,149 A * | 1/1998 | Araki | 60/278 |
| 5,746,989 A * | 5/1998 | Murachi et al. | 423/213.7 |
| 5,846,276 A * | 12/1998 | Nagai et al. | 55/523 |
| 6,021,639 A * | 2/2000 | Abe et al. | 60/297 |
| 6,294,141 B1 * | 9/2001 | Twigg et al. | 423/213.7 |
| 6,871,489 B2 * | 3/2005 | Tumati et al. | 60/285 |
| 7,104,051 B2 * | 9/2006 | Shimasaki et al. | 60/297 |
| 7,337,607 B2 * | 3/2008 | Hou et al. | 60/274 |
| 2006/0260299 A1 * | 11/2006 | Wang et al. | 60/297 |
| 2007/0039298 A1 | 2/2007 | Tokumaru | |
| 2007/0227104 A1 | 10/2007 | Gonze et al. | |
| 2008/0022659 A1 * | 1/2008 | Viola et al. | 60/286 |
| 2008/0141661 A1 * | 6/2008 | Voss et al. | 60/295 |
| 2008/0223019 A1 * | 9/2008 | Gonze et al. | 60/286 |
| 2009/0019839 A1 * | 1/2009 | Gray, Jr. | 60/287 |
| 2010/0266471 A1 * | 10/2010 | Xu et al. | 423/239.2 |

FOREIGN PATENT DOCUMENTS

CN 1859962 A 11/2006

* cited by examiner

Primary Examiner — Thomas Denion
Assistant Examiner — Jesse Bogue
(74) *Attorney, Agent, or Firm* — Cantor Colburn LLP

(57) ABSTRACT

An exhaust gas particulate filter system for an internal combustion engine comprises an exhaust gas conduit in fluid communication with, and configured to receive exhaust gas from, the internal combustion engine. A hydrocarbon supply is connected to the exhaust gas conduit and is in fluid communication with the exhaust gas for delivery of hydrocarbon thereto. A particulate filter assembly is located downstream of the hydrocarbon injector for receipt of the exhaust gas and hydrocarbon mixture. The particulate filter assembly comprises an exhaust gas filter disposed therein for removal of particulates from the exhaust gas and an electrically heated catalyst device disposed therein, upstream of the exhaust gas filter, and heatable to induce oxidation of the exhaust gas and hydrocarbon mixture and to heat the exhaust gas filter and burn particulates collected therein.

20 Claims, 3 Drawing Sheets

APPARATUS AND METHOD FOR REGENERATING AN EXHAUST FILTER

FIELD OF THE INVENTION

Exemplary embodiments of the present invention relate to exhaust gas treatment systems for internal combustion engines and, more particularly, to an efficient system for regeneration of an exhaust particulate filter.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in a diesel engine exhaust system to convert certain, or all of these exhaust constituents into non-regulated exhaust gas components.

An exhaust treatment technology, in use for high levels of particulate matter reduction, is the Diesel Particulate Filter device ("DPF"). There are several known filter structures used in DPF's that have displayed effectiveness in removing the particulate matter from the exhaust gas such as ceramic honeycomb wall flow filters, wound or packed fiber filters, open cell foams, sintered metal fibers, etc. Ceramic wall flow filters have experienced significant acceptance in automotive applications.

The filter is a physical structure for removing particulates from exhaust gas and, as a result, the accumulation of filtered particulates will have the effect of increasing the exhaust system backpressure experienced by the engine. To address backpressure increases caused by the accumulation of exhaust gas particulates, the DPF is periodically cleaned, or regenerated. Regeneration of a DPF in vehicle applications is typically automatic and is controlled by an engine or other controller based on signals generated by engine and exhaust system sensors. The regeneration event involves increasing the temperature of the DPF to levels that are often above 600° C. in order to burn the accumulated particulates.

One method of generating the temperatures required in the exhaust system for regeneration of the DPF is to deliver unburned HC to an oxidation catalyst device disposed upstream of the DPF. The HC may be delivered by injecting fuel directly into the exhaust gas system or may be achieved by "over-fueling" the engine resulting in unburned HC exiting the engine in the exhaust gas. The HC is oxidized in the oxidation catalyst device resulting in an exothermic reaction that raises the temperature of the exhaust gas. The heated exhaust gas travels downstream to the DPF and burns the particulate accumulation. A disadvantage to this method of regeneration is that the delivery of unburned HC to the engine exhaust system reduces the efficiency of the engine/vehicle since the fuel is not being used to do useful work. Additionally, depending upon the delivery location of the HC, heat loss to the engine and the exhaust system, upstream of the DPF can be significant; further reducing the system efficiency. Also, in instances where fuel is delivered by over-fueling the engine, some fuel may bypass the pistons resulting in undesirable fuel dilution of the engine oil.

Another method for generating temperatures sufficient to regenerate the DPF has involved the placement of an electric heater adjacent to the upstream face of the filter. When energized, the electric heater operates to deliver thermal energy to the upstream face of the filter that is sufficient for the ignition of the filtered particulates. A disadvantage of this regeneration method is that it requires significant electrical power to operate effectively, which is detrimental to engine/vehicle efficiency. In addition, the combustion of particulates is initiated at the leading or upstream end of the DPF filter and complete regeneration of the filter relies on propagation of the combustion throughout the entire device.

Accordingly, it is desirable to provide an apparatus and method for regenerating a DPF that will result in reduced consumption of HC and lower electrical requirements for efficient operation thereof.

SUMMARY OF THE INVENTION

In an exemplary embodiment of the present invention, an exhaust gas particulate filter system for an internal combustion engine is provided. The system comprises an exhaust gas conduit in fluid communication with, and configured to receive exhaust gas from, the internal combustion engine. A hydrocarbon supply is connected to the exhaust gas conduit and is in fluid communication with the exhaust gas for delivery of hydrocarbon thereto. A particulate filter assembly is in fluid communication with the exhaust gas conduit and is located downstream of the hydrocarbon supply for receipt of the exhaust gas and hydrocarbon mixture. The particulate filter assembly further comprises an exhaust gas filter disposed within the particulate filter assembly for removal of particulates from the exhaust gas and an electrically heated catalyst device disposed within the particulate filter assembly, upstream of the exhaust gas filter, and heatable to induce oxidation of the exhaust gas and hydrocarbon mixture to thereby heat the exhaust gas filter and burn particulates collected therein.

In another exemplary embodiment of the present invention, an exhaust gas treatment system for an internal combustion engine is provided. The exhaust gas treatment system comprises an exhaust gas conduit in fluid communication with, and configured to receive exhaust gas from, the internal combustion engine and to conduct the exhaust gas between devices of the exhaust gas treatment system. A first oxidation catalyst device, for reduction of hydrocarbon and CO in the exhaust gas, is disposed in fluid communication with the exhaust gas conduit and a selective catalyst reduction device, for reduction of components of $NO_x$ in the exhaust gas, is disposed in fluid communication with the exhaust gas conduit downstream of the first oxidation catalyst device. A hydrocarbon injector is connected to the exhaust gas conduit downstream of the selective catalyst reduction device and in fluid communication with the exhaust gas for delivery of hydrocarbon thereto. A particulate filter assembly is in fluid communication with the exhaust gas conduit and is located downstream of the hydrocarbon injector for receipt of the exhaust gas and hydrocarbon mixture. The particulate filter assembly comprises an exhaust gas filter disposed within the particulate filter assembly for removal of particulates from the exhaust gas and an electrically heated catalyst device disposed within the particulate filter assembly, upstream of the exhaust gas filter and heatable to induce oxidation of the exhaust gas and hydrocarbon mixture to thereby heat the exhaust gas filter and burn particulates collected therein.

In yet another exemplary embodiment of the invention, a method for regenerating an exhaust gas particulate filter system for an internal combustion engine having an exhaust gas conduit in fluid communication with, and configured to receive exhaust gas from, the internal combustion engine, a hydrocarbon supply connected to the exhaust gas conduit, and in fluid communication with the exhaust gas, for delivery of hydrocarbon thereto, a particulate filter assembly having an exhaust gas filter disposed therein for removal of particulates from the exhaust gas and an electrically heated catalyst oxidation device disposed therein, upstream of the exhaust gas filter; comprises sensing the exhaust back pressure upstream of the particulate filter, determining that the exhaust back pressure has reached a level indicative of the need to heat the exhaust gas filter and burn particulates collected therein, energizing the electrically heated catalyst oxidation device to a desired temperature, energizing the hydrocarbon supply to deliver unburned hydrocarbon upstream of the electrically heated catalyst oxidation device and monitoring the temperature of the particulate filter and adjusting the delivery of unburned hydrocarbon to effect combustion of particulates therefrom.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
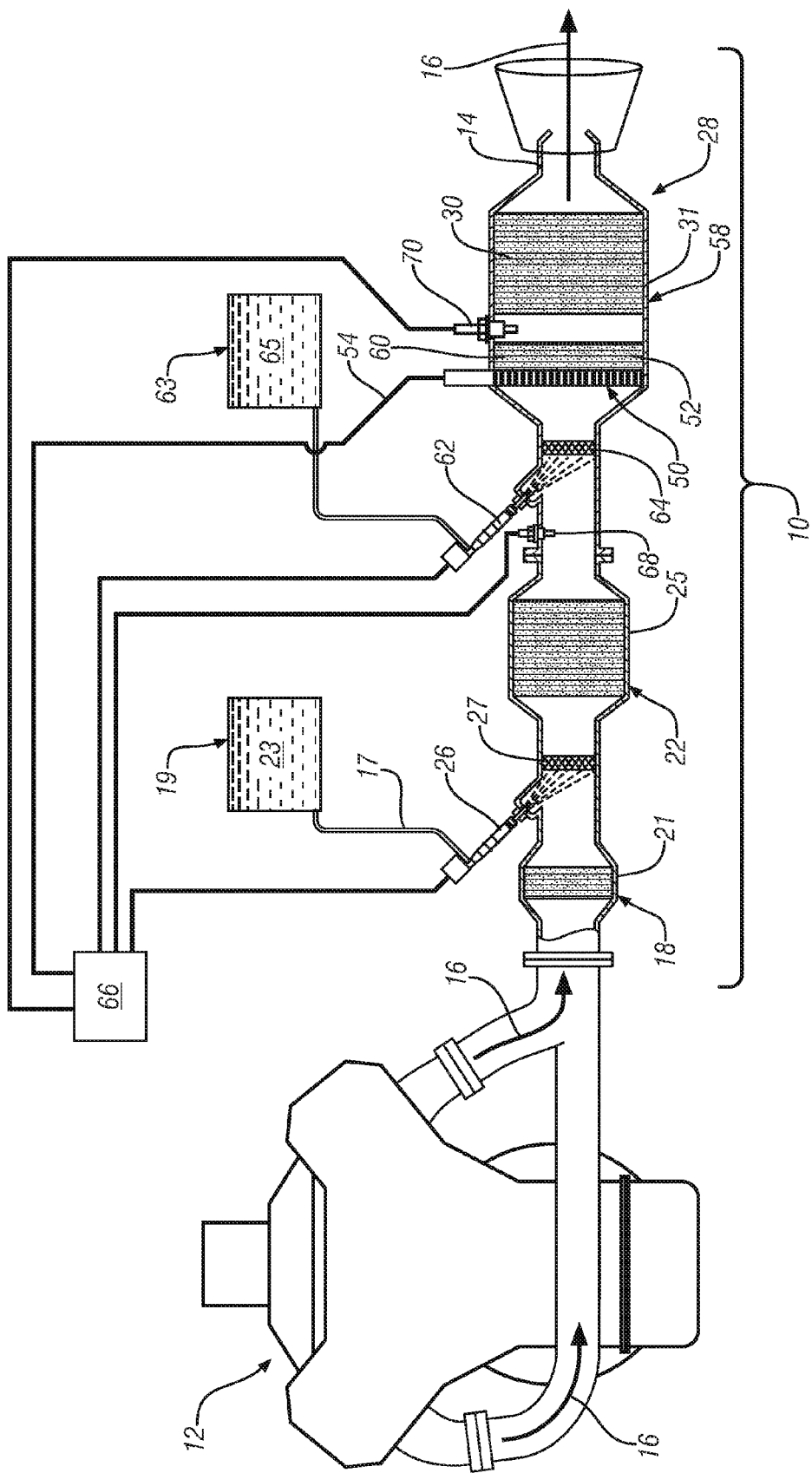
FIG. 1 is a schematic view of an exhaust gas treatment system for an internal combustion engine.

The following description is merely exemplary in nature and is not intended to limit the present disclosure, application or uses. It should be understood that throughout the drawings, corresponding reference numerals indicate like or corresponding parts and features.

Referring now to FIG. 1, an exemplary embodiment of the invention is directed to an exhaust gas treatment system, referred to generally as 10, for the reduction of regulated exhaust gas constituents of an internal combustion engine, such as diesel engine 12. It is appreciated that the diesel engine 12 is merely exemplary in nature and that the invention described herein can be implemented in various engine systems implementing an exhaust particulate filter. Such engine systems may include, but are not limited to, gasoline direct injection systems and homogeneous charge compression ignition engine systems. For ease of description and discussion, the disclosure will be discussed in the context of a diesel engine 12.

The exhaust gas treatment system includes an exhaust gas conduit 14, which may comprise several segments that function to transport exhaust gas 16 from the diesel engine 12 to the various exhaust treatment devices of the exhaust gas treatment system 10. The exhaust treatment devices may include a first Diesel Oxidation Catalyst device ("DOC1") 18. The DOC1 may include a flow-through metal or ceramic monolith substrate 20 that is wrapped in an intumescent mat (not shown) that expands when heated, securing and insulating the substrate which is packaged in a stainless steel shell or canister 21 having an inlet and an outlet in fluid communication with exhaust gas conduit 14. The substrate 20 has an oxidation catalyst compound (not shown) disposed thereon. The oxidation catalyst compound may be applied as a wash coat and may contain platinum group metals such as platinum (Pt), palladium (Pd), rhodium (Rh) or other suitable oxidizing catalysts, or combination thereof The DOC1 18 is useful in treating unburned gaseous and non-volatile HC and CO, which are oxidized to form carbon dioxide and water.

A Selective Catalytic Reduction device ("SCR") 22 may be disposed downstream of the DOC1 18. In a manner similar to the DOC1, the SCR 22 may also include a flow-through ceramic or metal monolith substrate 24 that is wrapped in an intumescent mat (not shown) that expands when heated, securing and insulating the substrate which is packaged in a stainless steel shell or canister 25 having an inlet and an outlet in fluid communication with exhaust gas conduit 14. The substrate 24 has an SCR catalyst composition (not shown) applied thereto. The SCR catalyst composition preferably contains a zeolite and one or more base metal components such as iron ("Fe"), cobalt ("Co"), copper ("Cu") or vanadium which can operate efficiently to convert $NO_x$ constituents in the exhaust gas 16 in the presence of a reductant such as ammonia ('$NH_3$"). The $NH_3$ reductant 23, supplied from reductant supply tank 19 through conduit 17, may be injected into the exhaust gas conduit 14 at a location upstream of the SCR 22 using an injector 26, in fluid communication with conduit 17, or other suitable method of delivery of the reductant to the exhaust gas 16. The reductant may be in the form of a gas, a liquid or an aqueous urea solution and may be mixed with air in the injector 26 to aid in the dispersion of the injected spray. A mixer or turbulator 27 may also be disposed within the exhaust conduit 14 in close proximity to the injector 26 to further assist in thorough mixing of the reductant with the exhaust gas 16.

Figure 2:
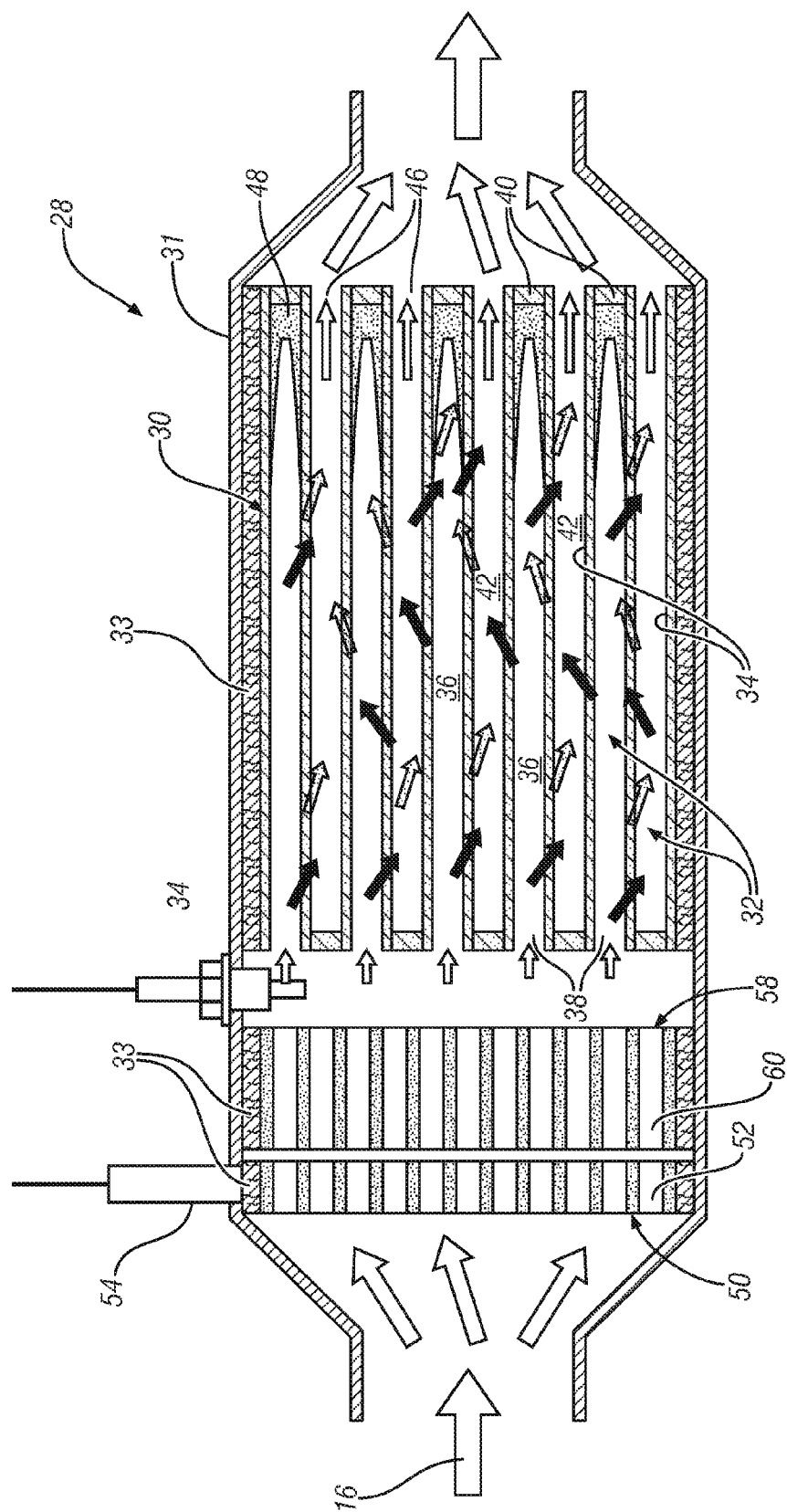
FIG. 2 is a sectional view of an exemplary embodiment of a diesel particulate filter device embodying aspects of the present invention.

Referring to FIGS. 1 and 2, an exhaust gas filter assembly, in this case a Diesel Particulate Filter device ("DPF") 28, is located within the exhaust gas treatment system 10, downstream of the SCR 22 and operates to filter the exhaust gas 16 of carbon and other particulates. The DPF 28 may be constructed using a ceramic wall flow monolith filter 30, FIG. 2 that is wrapped in an intumescent mat 33 that expands when heated, securing and insulating the filter which is packaged in a stainless steel shell or canister 31 having an inlet and an outlet in fluid communication with exhaust gas conduit 14. The ceramic wall flow monolith has a plurality of longitudinally extending passages 32 that are defined by longitudinally extending walls 34. The passages 32 include a subset of inlet passages 36 that have and open inlet end 38 and a closed outlet end 40, and a subset of outlet passages 42 that have a closed inlet end 44 and an open outlet end 46. Exhaust gas 16 entering the filter 30 through the inlet ends 38 of the inlet passages 36 is forced to migrate through adjacent longitudinally extending walls 34 to the outlet passages 42. It is through this wall flow mechanism that the exhaust gas 16 is filtered of carbon and other particulates 48. The filtered particulates are deposited on the longitudinally extending walls 34 of the inlet passages 36 and, over time, will have the effect of increasing the exhaust gas backpressure experienced by the diesel engine 12. It is appreciated that the ceramic wall flow monolith filter 30 is merely exemplary in nature and that the DPF may include other filter devices such as wound or packed fiber filters, open cell foams, sintered metal fibers, etc.

In an exemplary embodiment, the increase in exhaust backpressure caused by the accumulation of particulate matter 48 requires that the DPF 28 is periodically cleaned, or regenerated. Regeneration involves the oxidation or burning of the accumulated carbon and other particulates 48 in what is typically a high temperature (>600° C.) environment. For regeneration purposes, an electrically heated catalyst device ("EHC") 50 is disposed within canister 31 of the DPF 28. The EHC 50 may be constructed of any suitable material that is electrically conductive such as a wound or stacked metal monolith 52. An electrical conduit 54 that is connected to an electrical system, such as a vehicle electrical system, supplies electricity to the EHC 50 to thereby heat the device, as will be further described below. An oxidation catalyst compound (not shown) may be applied to the EHC 50 as a wash coat and may contain platinum group metals such as platinum (Pt), palladium (Pd), rhodium (Rh) or other suitable oxidizing catalysts, or combination thereof.

In an exemplary embodiment, a second Diesel Oxidation Catalyst device ("DOC2") 58 is disposed within canister 31 of the DPF 28. Like the DOC1 18, the DOC2 58 may include a flow-through metal or ceramic monolith substrate 60 that is wrapped in an intumescent mat 33 that expands when heated, securing and insulating the substrate in the stainless steel shell or canister 31. The substrate 60 has an oxidation catalyst compound (not shown) disposed thereon. The oxidation catalyst compound may be applied as a wash coat and may contain platinum group metals such as platinum (Pt), palladium (Pd), rhodium (Rh) or other suitable oxidizing catalysts, or combination thereof.

Referring again to FIG. 1, disposed upstream of the DPF 28, in fluid communication with the exhaust gas 16 in the exhaust gas conduit 14, is an HC, or fuel injector 62. The fuel injector 62, in fluid communication with HC 65 in fuel supply tank 63 through fuel conduit 61, is configured to introduce unburned HC 65 into the exhaust gas stream for delivery to the DPF 28. A mixer or turbulator 64 may also be disposed within the exhaust conduit 14, in close proximity to the HC injector 62, to further assist in thorough mixing of the HC with the exhaust gas 16.

Referring again to FIG. 1, a controller such as vehicle controller 66 is operably connected to, and monitors, the exhaust gas treatment system 10 through signal communication with a number of sensors. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality.

In an exemplary embodiment, a backpressure sensor 68, located upstream of DPF 28, generates a signal indicative of the carbon and particulate loading in the ceramic wall flow monolith filter 30. Upon a determination that the backpressure has reached a predetermined level indicative of the need to regenerate the DPF 28, the controller 66 activates EHC 50 and raises the temperature of the EHC to a level suitable for rapid HC oxidation (about 450° C.). A temperature sensor 70, disposed within the shell 31 of the DPF 28 monitors the exhaust gas temperature downstream of the EHC 50. When the EHC 50 has reached the desired operational temperature, the controller 66 will activate the HC injector 62 to deliver fuel into the exhaust gas conduit 14 for mixing with the exhaust gas 16. The fuel/exhaust gas mixture enters the DPF 28 and flows through the heated EHC 50 that induces a rapid oxidation reaction and resultant exotherm. The heated exhaust gas resulting from the oxidation reaction in the EHC 50 flows through the passive DOC2 58 inducing a further, complete oxidation of the HC in the exhaust gas 16 and raising the exhaust gas temperature to a level (>600° C.) suitable for regeneration of the carbon and particulate matter 48 in the ceramic wall flow monolith filter 30. The controller 66 may monitor the temperature of the exothermic oxidation reaction in the EHC 50 the DOC2 58 and the ceramic wall flow monolith filter 30 through temperature sensor 70 and adjust the HC delivery rate of injector 62 to maintain a predetermined temperature.

In another exemplary embodiment, it is contemplated that, in some circumstances the fuel injector 62 may be dispensed with in favor of engine control of the hydrocarbon levels in the exhaust gas 16. In such an instance the controller such as vehicle controller 66 is operably connected to, and monitors, the exhaust gas treatment system 10 through signal communication with a number of sensors such as backpressure sensor 68. The backpressure sensor generates a signal indicative of the carbon and particulate loading in the ceramic wall flow monolith filter and, upon a determination that the backpressure has reached a predetermined level indicative of the need to regenerate the DPF 28, the controller 66 activates EHC 50 and raises the temperature of the EHC to a level suitable for rapid HC oxidation (about 450° C.). Temperature sensor 70 monitors the exhaust gas temperature downstream of the EHC 50 and when the EHC 50 has reached the desired operational temperature, the controller 66 will adjust the engine timing and rate/frequency of fueling to deliver excess, unburned fuel into the exhaust gas conduit 14 for mixing with the exhaust gas 16. The fuel/exhaust gas mixture enters the DPF 28 and flows through the heated EHC 50 that induces a rapid oxidation reaction and resultant exotherm. As above, heated exhaust gas resulting from the oxidation reaction in the EHC 50 flows through the passive DOC2 58 inducing a further, complete oxidation of the HC in the exhaust gas 16 and raising the exhaust gas temperature to a level (>600° C.) suitable for regeneration of the carbon and particulate matter 48 in the ceramic wall flow monolith filter 30. The controller 66 may monitor the temperature of the exothermic oxidation reaction in the EHC 50 the DOC2 58 and the ceramic wall flow monolith filter 30 through temperature sensor 70 and adjust the HC delivery rate from the engine 12 to maintain a predetermined temperature.

Figure 3:
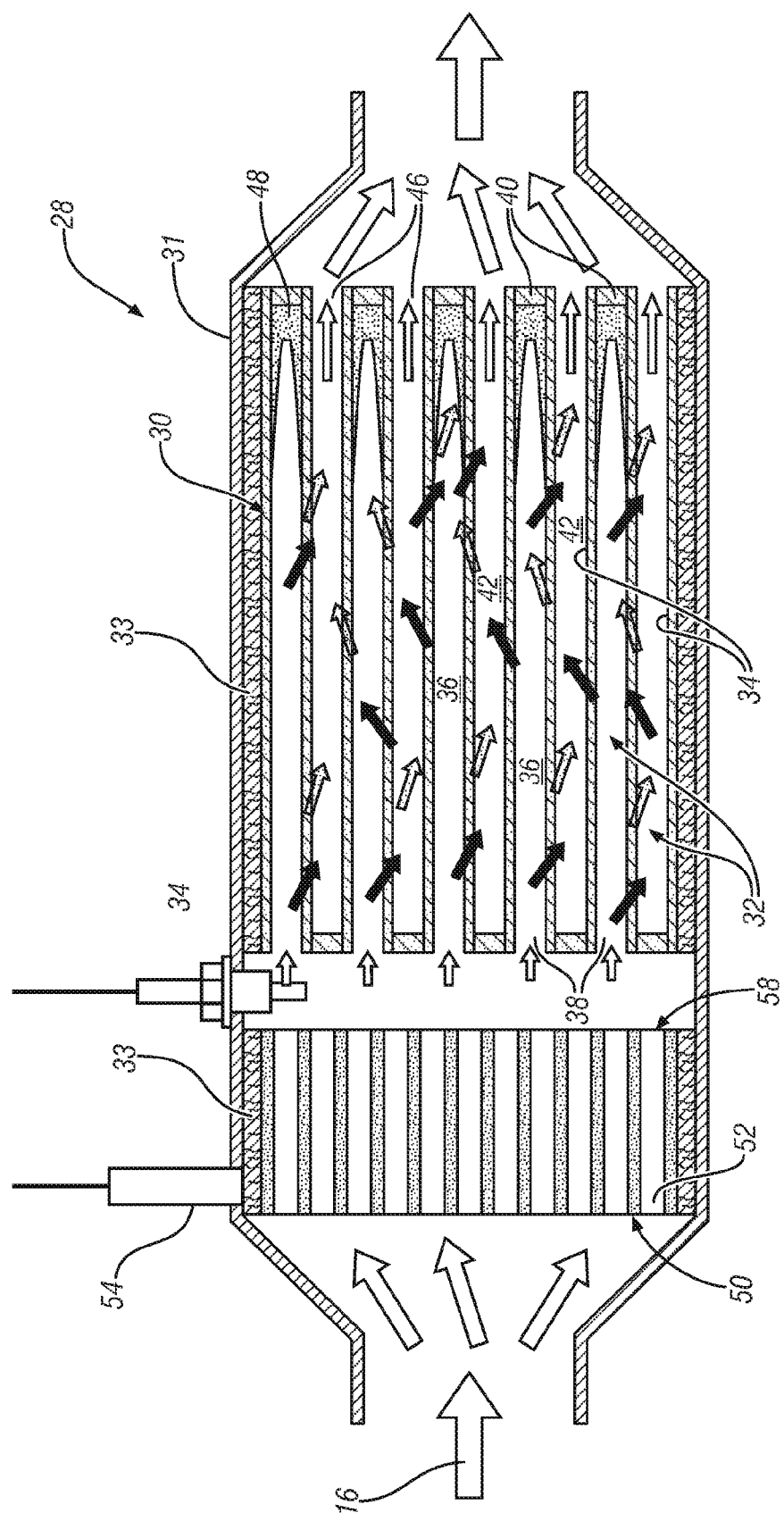
FIG. 3 is a sectional view of another embodiment of a diesel particulate filter device embodying aspects of the present invention.

The use of a small EHC 50 in combination with a passive DOC2 58 to establish the desired exothermic reaction for regeneration of the DPF 28 is effective to reduce the electrical power that is required to initialize the oxidation reaction. In another exemplary embodiment shown in FIG. 3, a degree of complexity may be removed from the DPF 28 through the use of a single, larger EHC 50 and elimination of the passive DOC2. However, the use of the larger EHC 50 may come at a penalty in system efficiency due to the increased electrical demand required to operate the larger heater.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:
1. An internal combustion engine and exhaust gas particulate filter system, comprising:
    an internal combustion engine;

an exhaust gas conduit in fluid communication with, and configured to receive an exhaust gas from, the internal combustion engine;

a hydrocarbon supply connected to and in fluid communication with the exhaust gas conduit for delivery of a hydrocarbon thereto and formation of an exhaust gas and hydrocarbon mixture therein;

a particulate filter assembly in fluid communication with the exhaust gas conduit and configured to receive the exhaust gas and hydrocarbon mixture, the particulate filter assembly comprising:

an exhaust gas filter disposed within the particulate filter assembly for removal of particulates from the exhaust gas;

an electrically heated catalyst device disposed within the particulate filter assembly, upstream of the exhaust gas filter and heatable to induce oxidation of the exhaust gas and hydrocarbon mixture to heat the exhaust gas and burn particulates collected in the exhaust gas filter; and an oxidation catalyst device disposed within the particulate filter assembly between the electrically heated catalyst device and the exhaust gas filter, the exhaust gas filter, oxidation catalyst and electrically heated catalyst device disposed within a single canister.

2. The exhaust gas particulate filter system for an internal combustion engine of claim 1, wherein the hydrocarbon supply comprises a hydrocarbon injector connected to and in fluid communication with the exhaust gas conduit upstream of the electrically heated catalyst device.

3. The exhaust gas particulate filter system for an internal combustion engine of claim 1, wherein the hydrocarbon supply comprises the engine.

4. The exhaust gas particulate filter system for an internal combustion engine of claim 1, wherein the oxidation catalyst device is disposed on an inlet end of the exhaust gas filter.

5. The exhaust gas particulate filter system for an internal combustion engine of claim 4, further comprising:
a catalyst compound applied to the electrically heated catalyst device, the oxidation catalyst device or both devices and comprising a platinum group metal.

6. The exhaust gas particulate filter system for an internal combustion engine of claim 5, wherein the platinum group metal comprises platinum (Pt), palladium (Pd), rhodium (Rh) or other suitable oxidizing catalysts, or combination thereof.

7. The exhaust gas particulate filter system for an internal combustion engine of claim 1, further comprising:
a backpressure sensor in fluid communication with the exhaust gas conduit, upstream of the exhaust gas filter and configured to generate a signal indicative of a backpressure of the exhaust gas; and
a controller in communication with the backpressure sensor and the hydrocarbon supply and configured to deliver the hydrocarbon into the exhaust gas when the signal reaches a level indicative of the need to heat the exhaust gas filter and burn particulates collected therein.

8. The exhaust gas particulate filter system for an internal combustion engine of claim 1, further comprising:
a temperature sensor configured for fluid communication with the exhaust gas in the particulate filter assembly and configured to generate a signal indicative of the temperature of the exhaust gas therein; and
a controller in communication with the temperature sensor and the hydrocarbon supply and configured to control hydrocarbon delivery and maintain a predetermined exhaust gas temperature sufficient to burn particulates in the exhaust gas filter.

9. The exhaust gas particulate filter system for an internal combustion engine of claim 1, wherein the exhaust gas filter further comprises:
a ceramic monolith having exhaust flow passages extending therethrough defined by longitudinally extending porous walls therebetween, the exhaust flow passages comprising:
a first subset of inlet passages having an open inlet end and a closed outlet end; and
a second subset of outlet passages having a closed inlet end and an open outlet end, wherein the ceramic monolith is configured to receive the exhaust gas through the inlet passages and migrate the exhaust gas through the longitudinally extending porous walls to the outlet passages and remove particulates from the exhaust gas.

10. The exhaust gas particulate filter system for an internal combustion engine of claim 2, further comprising:
a turbulator disposed in the exhaust gas conduit adjacent to and downstream from the hydrocarbon injector and configured to mix the hydrocarbon and exhaust gas upstream of the particulate filter assembly.

11. An exhaust gas treatment system for an internal combustion engine comprising:
an internal combustion engine;
an exhaust gas conduit in fluid communication with, and configured to receive an exhaust gas from, the internal combustion engine and to conduct the exhaust gas between a plurality of devices of the exhaust gas treatment system;
a first oxidation catalyst device, configured for oxidation of hydrocarbon and CO in the exhaust gas, disposed in fluid communication with the exhaust gas conduit;
a selective catalyst reduction device, configured for reduction of components of NOx in the exhaust gas, disposed in fluid communication with the exhaust gas conduit downstream of the first oxidation catalyst device;
a hydrocarbon injector connected to the exhaust gas conduit downstream of the selective catalyst reduction device and in fluid communication with the exhaust gas conduit for delivery of hydrocarbon thereto and formation of an exhaust gas and hydrocarbon mixture;
a particulate filter assembly in fluid communication with the exhaust gas conduit and located downstream of the hydrocarbon injector and configured for receipt of the exhaust gas and hydrocarbon mixture wherein the particulate filter assembly comprises:
an exhaust gas filter disposed within the particulate filter assembly and configured for removal of particulates from the exhaust gas; and
an electrically heated catalyst device disposed within the particulate filter assembly, upstream of the exhaust gas filter and configured for heating to induce oxidation of the exhaust gas and hydrocarbon mixture to heat the exhaust gas and burn particulates collected in the exhaust gas filter, the exhaust gas filter and electrically heated catalyst device disposed within a single canister; and
a second oxidation catalyst device disposed within the particulate filter assembly between the electrically heated catalyst device and the exhaust gas filter and configured to induce further oxidation of the exhaust gas and hydrocarbon mixture downstream of the electrically heated catalyst device to further heat the exhaust gas and burn particulates collected in the exhaust gas filter.

12. The exhaust gas treatment system for an internal combustion engine of claim 11, further comprising:

a reductant injector connected to the exhaust gas conduit upstream of the selective catalyst reduction device and in fluid communication with the exhaust gas and configured for delivery of a reductant having an ammonia component to the selective catalyst reduction device.

13. The exhaust gas treatment system for an internal combustion engine of claim 11, further comprising:
a catalyst compound applied to the selective catalyst reduction device containing a zeolite and a base metal component comprising iron ("Fe"), cobalt ("Co"), copper ("Cu") or vanadium, or a combination thereof, that is configured to reduce NOx in the exhaust gas in the presence the reductant comprising urea or ammonia, or a combination thereof.

14. The exhaust gas treatment system for an internal combustion engine of claim 11, wherein the second oxidation catalyst device is disposed on an inlet end of the exhaust gas filter.

15. The exhaust gas treatment system for an internal combustion engine of claim 14, further comprising:
an oxidation catalyst applied to at least one of the oxidation catalyst device or electrically heated catalyst device comprising a platinum group metal.

16. The exhaust gas treatment system for an internal combustion engine of claim 15, wherein the Pt group metal comprises platinum (Pt), palladium (Pd), or rhodium (Rh), or combination thereof.

17. The exhaust gas treatment system for an internal combustion engine of claim 11, further comprising:
a backpressure sensor in fluid communication with the exhaust gas conduit, upstream of the exhaust gas filter and configured to generate a signal indicative of a backpressure of the exhaust gas; and
a controller in signal communication with the backpressure sensor and the hydrocarbon injector and configured to inject hydrocarbon into the exhaust gas when the signal reaches a predetermined level indicative of the need to heat the exhaust gas filter and burn particulates collected therein.

18. The exhaust gas treatment system for an internal combustion engine of claim 11, further comprising:
a temperature sensor configured for fluid communication with the exhaust conduit in the particulate filter assembly and configured to generate a signal indicative of a temperature of the exhaust gas therein; and
a controller in communication with the temperature sensor and the hydrocarbon injector and configured to adjust the rate of hydrocarbon delivery to maintain a desired exhaust gas temperature to burn particulates in the exhaust gas filter.

19. The exhaust gas treatment system for an internal combustion engine of claim 11, wherein the exhaust gas filter further comprises:
a ceramic monolith having exhaust flow passages extending therethrough defined by longitudinally extending walls therebetween, the exhaust flow passages comprising:
a first subset of inlet passages having an open inlet end and a closed outlet end; and
a second subset of outlet passages having a closed inlet end and an open outlet end, wherein the exhaust gas enters the ceramic monolith through the inlet passages and migrates through the longitudinally extending walls to the outlet passages to remove particulates from the exhaust gas.

20. A method for regenerating an exhaust gas particulate filter system for an internal combustion engine having an exhaust gas conduit in fluid communication with, and configured to receive an exhaust gas from, the internal combustion engine, a first oxidation catalyst device configured for oxidation of hydrocarbon and CO in the exhaust gas disposed in fluid communication with the exhaust gas conduit, a hydrocarbon supply connected to the exhaust gas conduit downstream of the first oxidation catalyst and in fluid communication with the exhaust gas for delivery of hydrocarbon thereto, a particulate filter assembly having an exhaust gas filter disposed therein for removal of particulates from the exhaust gas, an electrically heated catalyst oxidation device disposed therein, upstream of the exhaust gas filter, an oxidation catalyst device disposed within the particulate filter assembly between the electrically heated catalyst device and the exhaust gas filter, the exhaust gas filter, oxidation catalyst and electrically heated catalyst device disposed within a single canister; comprising:
sensing an exhaust back pressure upstream of the particulate filter;
determining that the exhaust back pressure has reached a level indicative of the need to heat the exhaust gas filter and burn particulates collected therein;
activating the electrically heated catalyst oxidation device to a desired temperature;
activating the hydrocarbon supply to deliver unburned hydrocarbon upstream of the electrically heated catalyst oxidation device; and
monitoring the temperature of the particulate filter and adjusting the delivery of unburned hydrocarbon to effect combustion of particulates therefrom.

* * * * *